United States Patent [19]

Duff et al.

[11] 4,361,517

[45] Nov. 30, 1982

[54] CONTINUOUS SOAP STOCK SPLITTING

[75] Inventors: Alan J. Duff, Tonbridge, United Kingdom; Jacobus C. Segers, Nieuwerkerk aan de IJssel, Netherlands

[73] Assignee: Lever Brothers Company, New York, N.Y.

[21] Appl. No.: 163,251

[22] Filed: Jun. 26, 1980

Related U.S. Application Data

[63] Continuation of Ser. No. 866,435, Jan. 3, 1978, abandoned, and Ser. No. 719,766, Sep. 2, 1976, abandoned.

[30] Foreign Application Priority Data

Sep. 4, 1975 [GB] United Kingdom ............... 36461/75

[51] Int. Cl.³ .............................................. C11B 13/00
[52] U.S. Cl. ................................ 260/412.5; 260/413; 260/424
[58] Field of Search .................. 260/413 S, 417, 418, 260/424, 415, 412.5; 23/230 A

[56] References Cited

U.S. PATENT DOCUMENTS

| | | | |
|---|---|---|---|
| 2,607,718 | 8/1952 | Suthard | 23/230 A |
| 3,216,925 | 11/1965 | Fanning et al. | 23/253 A |
| 3,428,660 | 1/1969 | Morren et al. | 260/412.5 |
| 3,804,819 | 4/1974 | Wengrow | 260/418 |

FOREIGN PATENT DOCUMENTS

| | | |
|---|---|---|
| 1046234 | 3/1960 | Fed. Rep. of Germany . |
| 1083003 | 8/1960 | Fed. Rep. of Germany . |
| 1467542 | 2/1962 | Fed. Rep. of Germany . |
| 1074744 | 10/1954 | France . |
| 33-231961 | 10/1958 | Japan . |
| 714160 | 12/1956 | United Kingdom . |
| 787715 | 9/1957 | United Kingdom . |
| 834778 | 7/1959 | United Kingdom . |

OTHER PUBLICATIONS

D. L. Hoyle, *The effect of process design on pH and pIon control*, 18th ISA-AID symposium, San Francisco, CA, 5/3/72.

*Primary Examiner*—John F. Niebling
*Attorney, Agent, or Firm*—Irving N. Feit; James J. Farrell

[57] ABSTRACT

Automatically controlled process for the neutralization of soap solutions in which an acid is mixed with the soap solution just before or as said soap solution enters a reaction zone, in which turbulent flow conditions are maintained, the relative amounts of acid and soap solution being controlled via a signal derived from the measurement of the pH of the turbulent reaction mixture, and the ratio of the total dead time to the mean residence time of the reaction mixture in the reaction zone is less than unity.

This process allows a stable content of the neutralization while using a low excess of acid, hence providing savings in chemicals, labor and oil losses, and reducing effluent problems.

8 Claims, 4 Drawing Figures

CONTINUOUS SOAP STOCK SPLITTING

This is a continuation application of Ser. No. 866,435 filed Jan. 3, 1978, now abandoned and a continuation of Ser. No. 719,766 filed Sept. 2, 1976, now abandoned.

The invention relates to neutralisation processes, in particular to the treatment of soap solutions, more particularly to the treatment of soap solutions produced in the alkali refining of triglyceride oils, to obtain fatty matter therefrom.

In the alkali refining of fatty glyceride oils, the oil is treated with aqueous alkali by a batch or continuous process in order to remove free fatty acids and other undesirable impurities present in the oil. This treatment results in a refined oil phase and in an aqueous phase, usually referred to as "soapstock", containing the fatty acid soap, some oil and impurities. The soapstock is usually separated from the refined oil phase either by settling, or by centrifuging. The total fatty matter content (T.F.M.) in the aqueous phase varies according to the type of crude oil and process used for alkali-refining the oil, and may be as high as 40% or as low as 0.2%.

The soapstock may then be acidified, e.g. with an acid, such as sulphuric acid or hydrochloric acid, and the reaction mixture subsequently separated into an acid oil, essentially consisting of free fatty acids, and an aqueous phase, usually referred to as "acid water", containing excess acid and salts thereof and some impurities.

The treatment with acid is usually referred to as "soapstock-splitting".

Heretofore, the soapstock-splitting has mostly been carried out in batch operations. In order to obtain a complete reaction between the acid and soapstock, the mixture is normally agitated with steam. This method of batch soapstock-splitting can result in poor quality acid oils and high acid consumption due to the relatively poor mixing conditions. The use of direct steam for agitation also leads to the emission of fumes giving bad odor and corrosion difficulties.

To avoid the above disadvantages of the batch process, continuous processes for the splitting of soapstock have been proposed. Although such continuous processes generally are advantageous as compared with the prior batch process, they have the serious drawback that a large excess of acid over the stoichiometric amount has to be used to ensure a complete splitting of all the soaps contained in the soapstock and to avoid formation of acid soaps. Formation of acid soaps means losses in the amount of recovered free fatty acids and increases the difficulties in the separation of the acid oil and the acid water. Therefore in practice often an excess of at least 30% up to 100% acid is used. Since the acid water separated from the acidulated soapstock does not possess any economical value, it has to be disposed of, but then the pH has to be adjusted by large amounts of alkali to reach a less objectionable level. However, also the high concentrations of salt in the acid water present environmental problems, and where disposal of effluents containing such high amounts of salt into open waters and/or sewer systems is not allowed, a great deal of expense is involved to treat the acid water.

According to the process of the invention an acid is added to a stream of the soap solution just before or as said solution enters a reaction zone, in which turbulent flow conditions are maintained, the relative amounts of acid and soap solution being controlled via a signal derived from the measurement of the pH of the turbulent reaction mixture, the ratio of the total dead time to the mean residence time of the reaction mixture in the reaction zone being less than unity.

It is a major advantage of the process of the invention that it allows automatic control of the acidulation of soap solutions, such that the amount of excess acid to be used is drastically reduced as compared with prior art processes. Usually stable pH control is achieved with an acid excess of only 10 to 20%.

Another advantage is that only negligible amounts of acid soaps are formed, the soaps being completely converted into fatty acids and carrying of organic matter contained in the soapstock and side reactions being avoided.

A further advantage of the process of the invention is that the quality of the effluent is improved and the amount thereof being minimized as compared with prior art processes.

Further advantages will be apparent from the following detailed specification.

The process can be carried out at temperatures at which the viscosity of the soap solution and the reaction mixture is sufficiently low to ensure easy pumping through pipelines and turbulent flow conditions in the reaction zone can be maintained. For aqueous soapstocks derived from the alkali refining of some triglyceride oils, the viscosity at low temperatures is often too high and one has to work at an elevated temperature of between about 50° C. and about 100° C., preferably between about 70° C. and about 90° C.

Any soapstock can be treated regardless of the particular alkali refining operation from which it is obtained and of the particular oil thus refined. The soapstock has preferably a total fatty matter content ranging from about 1% to about 25%.

Soap solutions, either in water or non-aqueous solvents, originating from processes other than alkali refining can also be treated according to this invention.

As the acid preferably sulphuric acid is used, although other acids, such as hydrochloric acid, may be used as well.

Turbulent conditions should be maintained throughout the reaction zone.

Preferably, the ratio of the total dead time to the mean residence time is less than about 1:5, more preferably less than 1:1. The limiting value of this ratio depends on the titration characteristic of the soapstock and the constancy of the process conditions and may approach unity in ideal circumstances.

The pH can be measured in the reaction zone itself, but in view of easy accessibility for cleaning the pH measuring cell and to check its proper functioning, the pH measurement preferably takes place in the outlet of the reaction zone, just after the reaction mixture has left said zone.

It is important that the pH is measured while the reaction mixture is in a turbulent flow condition, to prevent separation of the reaction mixture into an acid oil phase and an acid aqueous phase. Such a separation would cause erratic pH measurements and hence jeopardize the controllability of the process. The required turbulence may be achieved by means known in the art, such as suitably placed baffles.

The acid should be preferably added to the soap solution just before or as the soap solution enters the reaction zone. By this is meant that the length of pipeline in an apparatus for carrying out the process of the invention, between the point of acid addition and the point where said pipeline is connected to the reaction zone, should be chosen as short as practically possible, because a too excessive length not only increases dead time, but also can lead to side-reactions, such as formation of acid soaps and/or sulphonation and charring when concentrated sulphuric acid is used. The exact length of pipeline allowable for a given neutralization plant can easily be ascertained by one skilled in the art applying the principles of the invention.

An embodiment of the process of the present invention is illustrated in the accompanying drawings, wherein.

Figure 1:
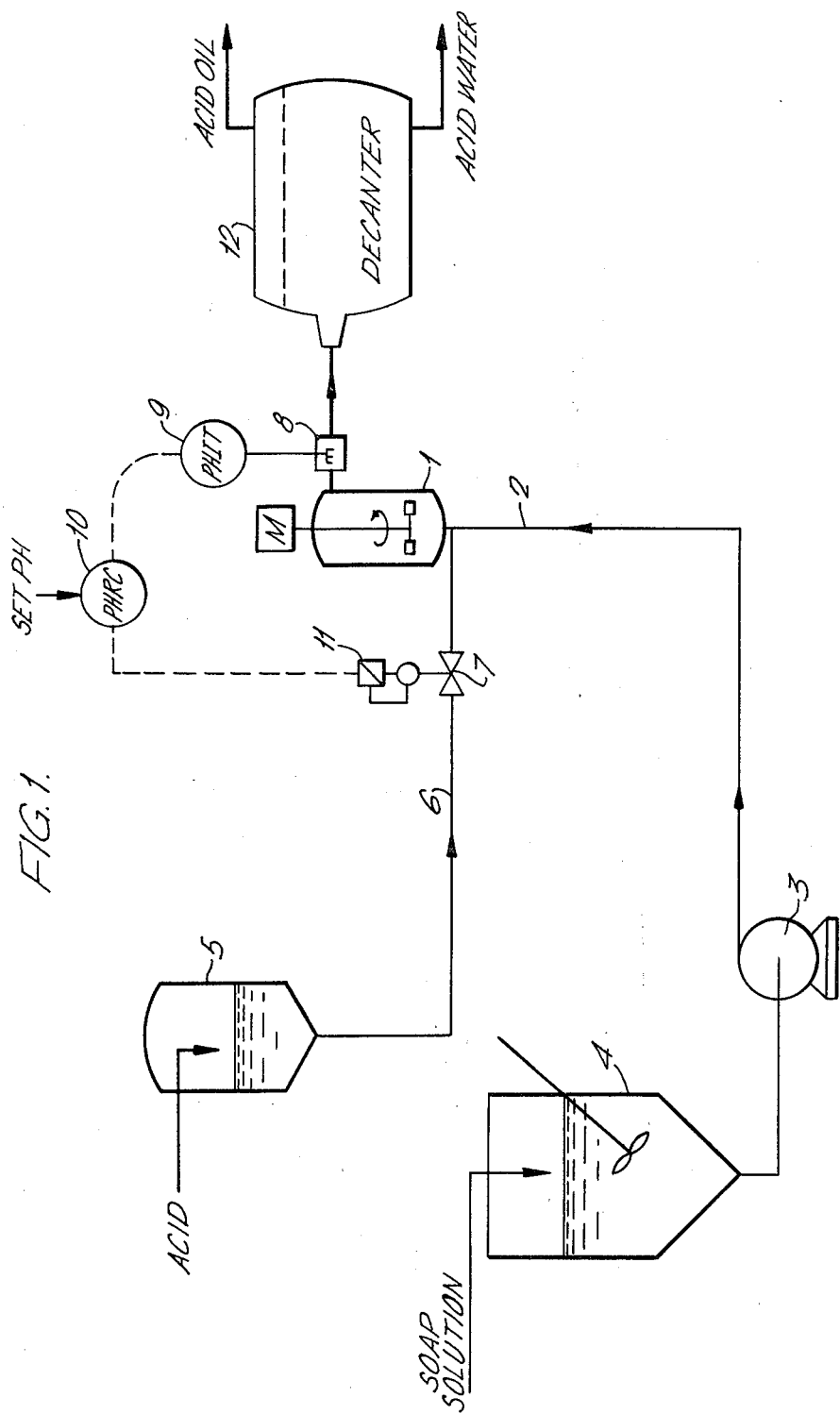
FIG. 1 is a process flow sheet illustrating a particular aspect of the process of the invention.

In FIG. 1 the mixing vessel is indicated by 1. The soapstock is fed into the mixing vessel by means of line 2, and pump 3. When the soapstock supply is fluctuating, it is preferably first fed into a buffer vessel 4, to ensure a more or less constant supply to the mixing vessel to facilitate a smooth process control. Said buffer vessel is preferably provided with some agitating means for keeping the soapstock homogeneous and optionally with some heating device, e.g. steam coils, for keeping the soapstock at the required temperature.

Acid is fed from a storage vessel 5, through a line 6 and through a control valve 7, into the soapstock. It is essential that the acid is added to the soapstock just before or as the soapstock stream enters the reaction zone, to minimize the contact time of the acid with the soapstock before they are thoroughly mixed, to avoid charring of organic material contained in the soapstock and to avoid side reactions, such as sulphonation. This point is also important in keeping down the dead time of the system.

The reaction vessel is preferably of the back mixing type, which means that soapstock and acid, which enter the reaction vessel, are mixed with the whole contents of the vessel within a shortest possible time. A suitable degree of back mixing can be achieved, e.g. by providing suitable stirrer means known in the art. This serves to smooth out pH fluctuations of short duration and to increase the controllability of the reaction. To ensure thorough intermixing of the acid and the soapstock turbulent conditions should be maintained in the reaction vessel. It has been found that for a reactor of the type shown in FIGS. 2 and 3 turbulence is sufficient when the Reynolds number is at least 8,000 calculated for the tip of the stirrer. Said Reynolds number for this case is given by the equation $$Re = \frac{\rho \cdot n \cdot d^2}{\eta}$$

wherein:
ρ = density of the soapstock (kg/m³)
n = stirrer speed (rev./s)
d = diameter of the stirrer (m)
n = viscosity of the soapstocks (Ns/m²)

As has been stated earlier in the specification, the ratio of the dead time and the mean residence time should be lower than unity. The mean residence time is given by the equation:

$$t_r = \frac{\text{volume between acid addition and pH measuring point}}{\text{flow rate of the reaction mixture}}$$

The internal dead time is defined here as the time delay between a fluctuation of the pH at the point of acid addition, caused by changes in acid flow, acid concentration, soapstock flow and/or soapstock concentration, and the moment said fluctuation is measured at the pH measuring electrode.

This internal dead time consists for a system as shown in FIG. 1 of the dead time for reaction vessel, plus the dead time of the length of pipeline between acid addition point and the reaction vessel and between reaction vessel and pH measuring point.

The dead time for a turbine stirred vessel, for instance, can be calculated from the equation:

$$t_d = \frac{\text{reactor volume}}{\Phi v}$$

wherein:
$t_d$ = dead time (sec), and
$\Phi v$ = pumping capacity of the stirrer (m³/s)

Said pumping capacity can in its turn be calculated from the equation:

$$\Phi v = K.n.d^3.$$

wherein:
d = diameter of stirrer (m)
n = stirrer speed (rev./s)
K = constant, depending on type of stirrer.

The dead time for the piping is equal to the time it takes for the soapstock to flow from the point of acid addition into the reaction vessel, plus the time the reaction mixture leaving the reaction vessel needs to reach the pH measuring point, if either, or both, of these points are external to the reaction vessel. These extra time lags should preferably be made as brief as possible by keeping the relevant connection lines as small as possible. By adding to the internal dead time the dead time of the control system, the total dead time is found.

From a theoretical viewpoint the pH is preferably measured in the reaction vessel, but because pH measurement cells require regular cleaning and checking, the pH measurement cell is preferably placed in the exit line of the reactor. Care should be taken that the reaction mixture within the pH measuring cell is in a turbulent condition, e.g. by the proper design of piping and/or the provision of adequate baffles, so as to avoid separation of acid oil and acid water, which separation would lead to erratic pH measurements, thereby detrimentally affecting the control of the process. Such steps to create and maintain turbulence are known in the art.

The pH measurement cell 8 in itself is of customary design known in the art. The signal given off by said cell is transmitted by device 9 (PHIT stands for "pH indicating transmittor") into e.g. a conventional three term process controller 10 (PHRC stands for "pH recording controller") compared with the pH set point and used to control the acid stream by means of the positioning device 11 and valve 7 as known in the art.

The reaction mixture is fed into a decanter 12 of conventional design for separation into acid oil and acid water. Similarly, separation can be carried out by centrifuging.

Accordingly the invention also provides an apparatus for carrying out the process of the invention, which apparatus comprises a mixing vessel (1) equipped with stirrer means, a pipeline (2) connected to said mixing vessel for introducing a soap solution, a pipeline (6) connected to said mixing vessel for introducing an acid in said vessel or in pipeline (2) at a point close to the mixing vessel, a control valve (7) inserted in either pipeline (2) or pipeline (6), a pH measuring cell (8) in the mixing vessel or in the outlet thereof, means (9) for transmitting a signal from the pH measuring cell to controller (10) by which flow rate through valve (7) is controlled in response to said signal, the volume of the mixing vessel, the position of valve (7), the position of pH measuring cell (8) and the stirrer capacity of the stirrer means being such that the ratio of the total dead time to the mean residence time is less than unity.

Figure 2:
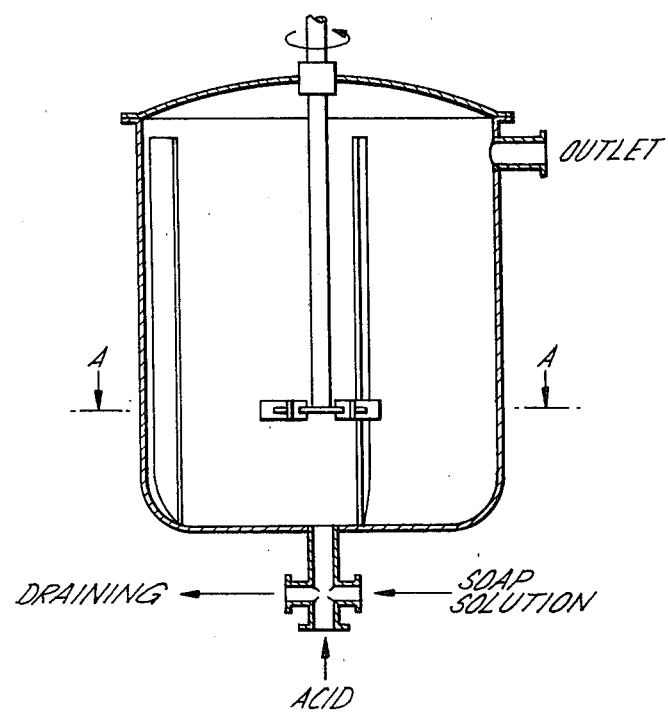
FIG. 2 is a sectional view of the mixing vessel 1 of FIG. 1.
Figure 3:
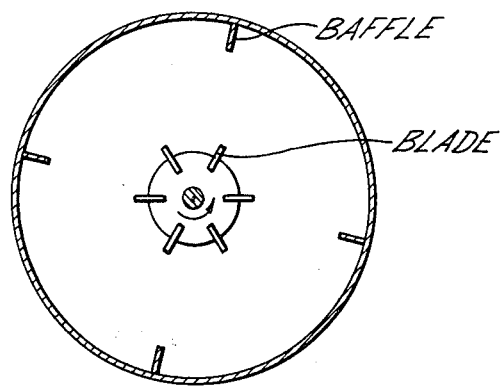
FIG. 3 is a sectional view of the mixing vessel of FIG. 2 along the plane A—A.

FIGS. 2 and 3 show cross-sections of a reaction vessel of standard design which can be used in the process of the invention. The reaction vessel preferably contains baffles to promote intermixing of the reactants and to ensure a sufficient degree of backmixing.

Figure 4:
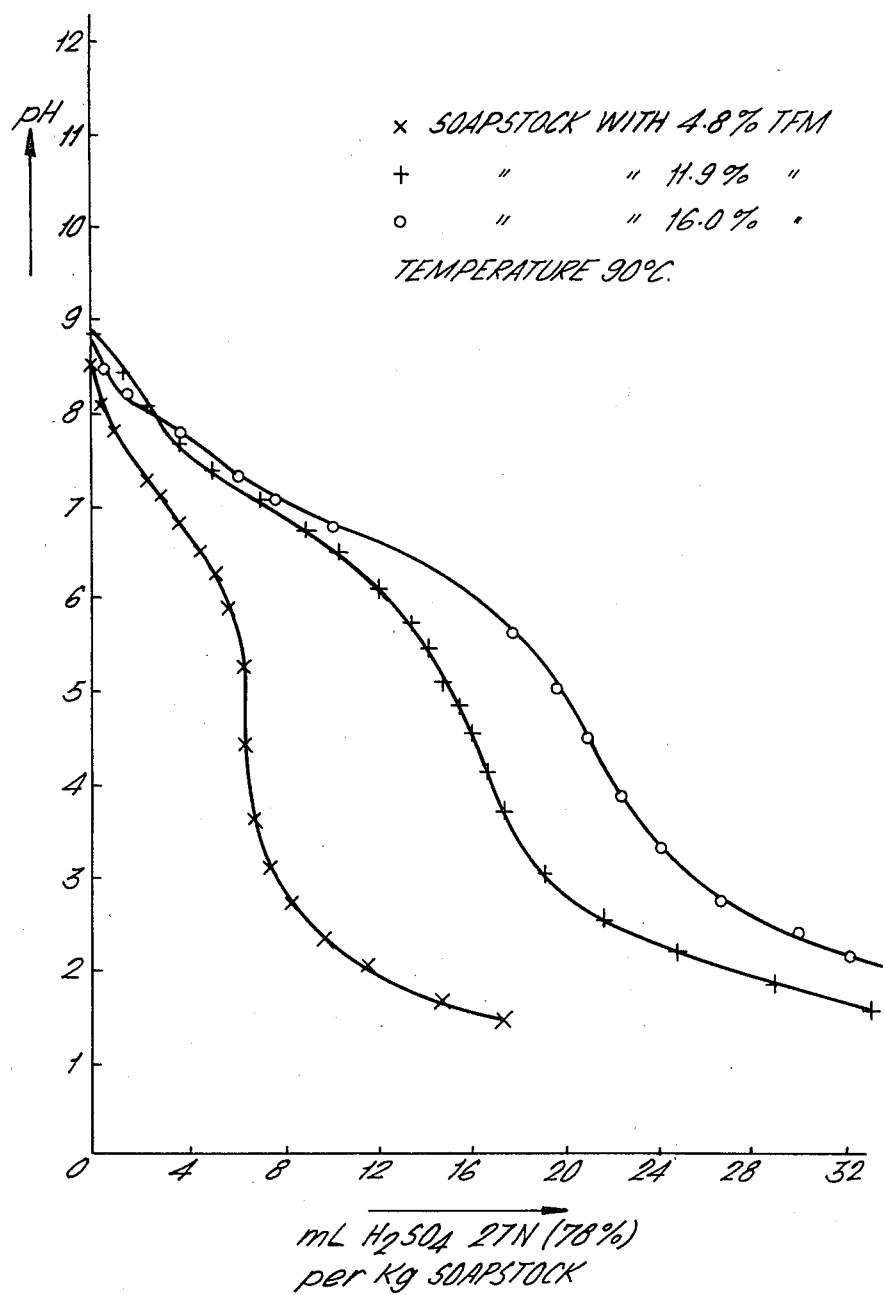
FIG. 4 represents typical titration curves of soapstocks of different total fatty matter content (TFM).

FIG. 4 shows titration curves of some typical soapstocks derived from soybean oil. It shows that a typical soapstock with a total fatty matter content (TFM) of 4.8% has a very steep part between a pH of about 7 and 2.5 in its titration curve, which implies that a small change in acid supply in this region will result in large and rapid variations in pH. It is in this region (e.g. pH 3.5) that the splitting reaction is preferably carried out and controlled. When attempting to control the operating point at pH=3.5, a slight reduction in acid supply (or increase in soap flow rate, etc.) will normally result in a rapid rise in pH value. It is this high pH sensitivity which induces the process operator of prior art processes to lower the set point below pH=3 to obtain more stability in the measurement. However, this will lead to a large excess in acid supply, e.g. an excess of 100% or more.

Contrary to such prior art processes, the process according to the present invention described above, makes it possible to achieve a stable measurement and control of the pH, while using only a slight excess of acid, usually less than 15% and mostly even only 10% or less, which results in a considerable saving in the soap splitting process.

EXAMPLE

In a process shown in the flow sheet of FIG. 1, and in a reaction vessel as shown in FIGS. 2 and 3, with a height to diameter ratio of 1:1, equipped with a turbine type stirrer having a blade diameter equal to ⅓ of the diameter of the vessel, and positioned at ⅓ of the height from the bottom of the vessel, soap splitting experiments were carried out. The soapstock had a temperature of 90° C. The reaction mixture was allowed to separate in a decanter during one hour. The upper layer (acid oil) consisted of the fatty acids and triglyceride oils and the lower layer (acid water) contained solubilised fatty material, glycerol and excess sulphuric acid which made the pH about 3. Further the following data were relevant for the trials:

volume of reaction vessel: 560 ml
volume of measuring cell: 210 ml
connection of the two was made by a flexible tube of which the length was varied, in order to vary the total dead time.

the soapstock flow was varied from 10–140 l/h
combining the last two facilities, made it possible to choose the ratio of total dead time to residence time from 1/7 to 1/20.

the stirrer speed was also varied
the sulfuric acid concentration was 78 weight %.

The results of the experiments are shown in the following table.

TABLE

| | Soapstock Properties | | | | | Reaction conditions | | |
|---|---|---|---|---|---|---|---|---|
| Origin | TFM (%) | FFA in TFM (%) | NaOH (%) | Acid value (—) | Viscosity (C.p.) | Stirrer speed (rev/m) | Reynolds number (—) | Splitting temp. (°C.) |
| Palm oil | 7.8 | 81.3 | 0.04 | — | 1.3 | 390 | 8000 | 90 |
| Palm oil | 7.8 | 81.3 | 0.04 | — | 1.3 | 390 | 8000 | 90 |
| Palm oil | 7.8 | 81.3 | 0.04 | — | 1.3 | 390 | 8000 | 90 |
| Palm oil | 7.8 | 81.3 | 0.04 | — | 1.7 | 510 | 8000 | 70 |
| Soya bean | 4.8 | 68.1 | — | 1.3 | 0.94 | 300 | 8000 | 90 |
| Soya bean oil | 4.8 | 68.1 | — | 1.3 | 1.02 | 300 | 8000 | 70 |

| | pH-controlling properties | | | | | | Analytical results | |
|---|---|---|---|---|---|---|---|---|
| Origin | Residence time (t$_r$) (sec) | Total dead time (t$_d$) (s) | Ratio t$_d$/t$_r$ | Splitting pH | Excess H$_2$SO$_4$ (%) | pH recording | Soap in acid oil (%) | TFM in acid water (ppm) |
| Palm oil | 24 | 3.7 | 1/7 | 3.0 | 10 | stable | <0.01 | — |
| Palm oil | 39 | 3.9 | 1/10 | 3.2 | 7 | stable | <0.01 | 600 |
| Palm oil | 80 | 4.0 | 1/20 | 3.0 | 10 | stable | <0.01 | — |
| Palm | 39 | 3.9 | 1/10 | 3.0 | 10 | stable | <0.01 | 540 |

TABLE-continued

| | | | | | | | | |
|---|---|---|---|---|---|---|---|---|
| oil | | | | | | | | |
| Soya bean | 39 | 3.9 | 1/10 | 3.2 | 12 | stable | <0.01 | 1100 |
| Soya bean oil | 39 | 3.9 | 1/10 | 3.2 | 12 | stable | <0.01 | 1010 |

We claim:

1. In the process for the continuous neutralization of a soap solution with an acid wherein said process comprises continuously introducing said acid and said soap solution into a vessel which forms a reaction zone, thereto react; and continuously removing the resulting reaction products from said vessel, wherein the relative amounts of said acid and said soap solution are controlled via a signal derived from the measurement of pH of said reaction product, the improvement comprising:
   a. adding said acid to a stream of soap solution:
      (i) just before said soap solution enters said reaction zone, or
      (ii) just as said soap solution enters said reaction zone;
   b. maintaining turbulent flow conditions corresponding to a Reynolds Number of at least 8,000 in said reaction zone, wherein said reaction zone is a stirred vessel of the back mixing type;
   c. controlling the relative amounts of said acid and said soap solution via a signal derived from the measurement of the pH of the turbulent reaction mixture; and
   d. keeping the ratio of the total dead time to the mean residence time of said mixture in said reaction zone at a value less than unity, the improvement thereby providing improved stability of the pH of said continuous neutralization resulting in reduced acid oil loss through the formation of acid soap while enabling improved savings in chemicals and the lessening of effluent problems.

2. A process according to claim 1 wherein said ratio of total dead time to the mean residence time is less than 0.2.

3. A process according to claim 1 wherein said ratio of dead time to the mean residence time is less than 0.1.

4. A process according to claim 1 wherein said measurement of the pH of the turbulent reaction mixture is at the outlet of the reaction zone.

5. A process according to claim 1 wherein said soap solution has a total fatty matter content of about 1 to about 25 percent.

6. A process according to claim 1 wherein said soap solution is an aqueous soapstock derived from an alkali refining process of a triglyceride oil.

7. A process according to claim 6 wherein said neutralization is carried out at a temperature of about 70° C. to about 100° C.

8. A process according to claim 6 wherein said neutralization is carried out at a temperature of about 70° C. to about 90° C.

* * * * *

UNITED STATES PATENT AND TRADEMARK OFFICE
CERTIFICATE OF CORRECTION

PATENT NO. : 4,361,517
DATED : November 30, 1982
INVENTOR(S) : Duff et al

It is certified that error appears in the above-identified patent and that said Letters Patent are hereby corrected as shown below:

Claim 3, "ratio of dead time" should read

--ratio of total dead time--.

Signed and Sealed this

Seventh Day of June 1983

[SEAL]

Attest:

DONALD J. QUIGG

Attesting Officer

Acting Commissioner of Patents and Trademarks